Patented Sept. 12, 1922.

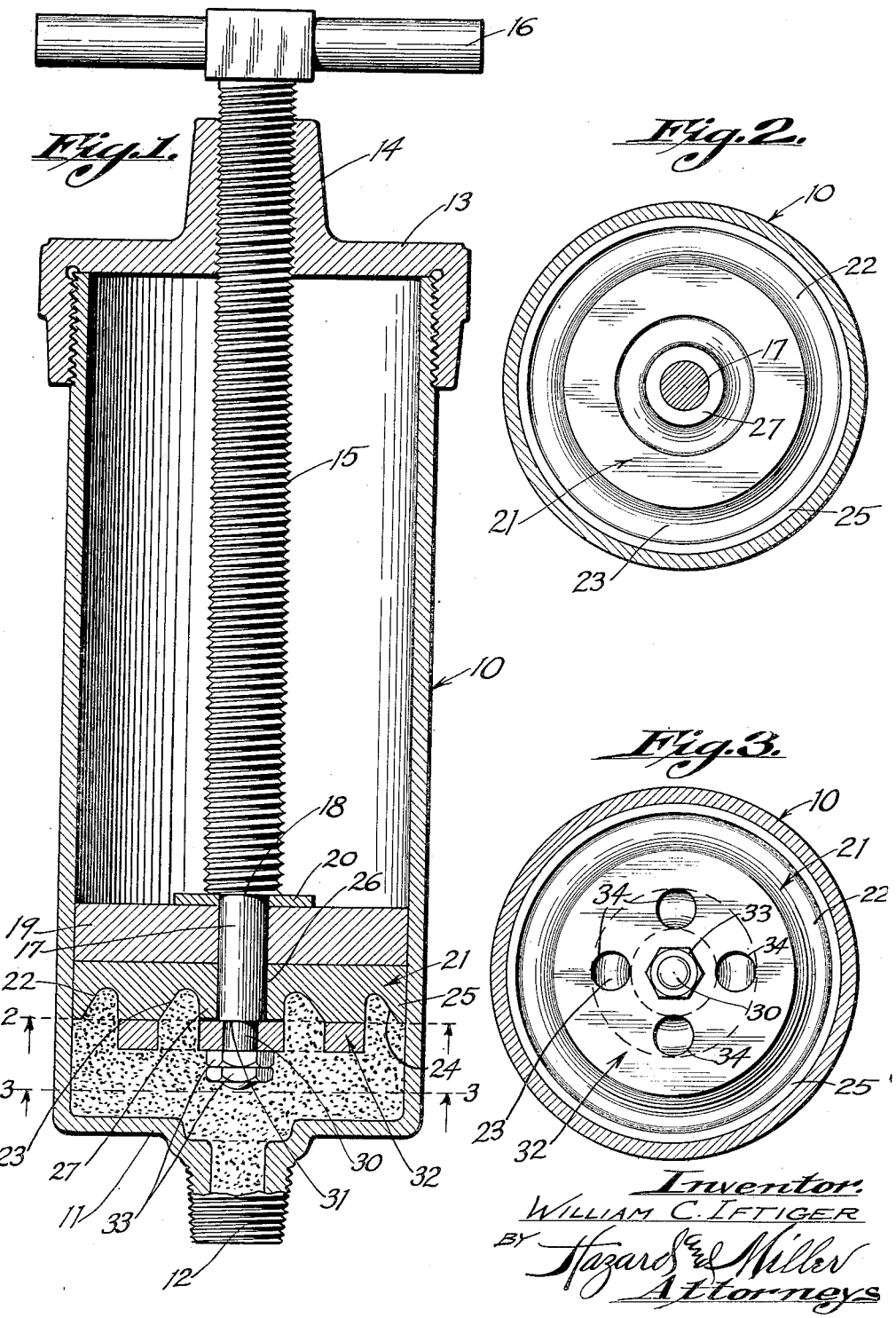

1,429,036

UNITED STATES PATENT OFFICE.

WILLIAM CARL IFTIGER, OF LOS ANGELES, CALIFORNIA.

PLUNGER.

Application filed March 15, 1921. Serial No. 452,481.

*To all whom it may concern:*

Be it known that I, WILLIAM CARL IFTIGER, a citizen of the United States, residing at Los Angeles, in the county of Los Angeles and State of California, have invented new and useful Improvements in Plungers, of which the following is a specification.

My invention relates to improvements in plungers of the type ordinarily employed in cylindrical containers for effecting the discharge of fluids, liquids or mobile bodies of material from said containers, and the particular type of plunger herein shown and described is designed for use in a lubricant delivering device known as a grease gun.

The particular objects of my invention are, to generally improve upon and simplify the construction of the existing types of plungers and to provide a relatively simple form of plunger and plunger packing that will effectually prevent the leakage of liquid or fluid pressure through the joint between the plunger and its inclosing cylinder and the packing member of said plunger being constructed so that its packing effectiveness automatically increases in direct proportion to the increase in pressure of the plunger against the liquid or fluid, or as the resistance of said liquid or fluid increases, and, by virtue of this automatic packing action, the plunger is especially applicable for high pressure service.

With the foregoing and other objects in view, my invention consists in certain novel features of construction and arrangement of parts that will be hereinafter more fully described and claimed, and illustrated in the accompanying drawings, in which:—

Fig. 1 is a vertical section taken lengthwise to the center of a lubricating device commonly known as a grease gun, and the same being provided with a plunger embodying my invention.

Fig. 2 is a cross section taken on the line 2—2 of Fig. 1.

Fig. 3 is a cross section taken on the line 3—3 of Fig. 1.

Referring by numerals to the accompanying drawings, which illustrate a practical embodiment of my invention, 10 designates the container of a grease gun, the same being in the form of a cylinder having its lower end closed by a plate 11 and the latter being provided with a centrally arranged discharge spout or nozzle 12.

The opposite end of the cylinder 10 is closed by a removable cap 13 having a centrally arranged internally threaded bearing 14, and passing through said bearing is a threaded rod or shaft 15 that is provided on its outer end with a handle 16. The end of the rod or shaft 15 within the cylinder 10 is reduced in diameter as designated by 17, thereby forming an annular shoulder 18 between the main body portion of the shaft or rod and said reduced end.

The plunger contemplated by my invention includes a disc 19 of metal that is centrally perforated in order to receive the reduced portion 17 of rod 15, and the diameter of this disc 19 is such that it will slide freely through the chamber within the cylinder 10.

Positioned on top of the disc 19 and bearing against the shoulder 18, is a relatively small disc or washer 20.

Positioned against the underside of disc 19 is a disc 21 of leather, rubber or analogous flexible material, and formed in the underside of this flexible disc is a pair of concentric grooves 22 and 23.

The groove 23 is arranged adjacent to the edge of the disc 21, and the outer face 24 of said groove is inclined so that the material in the outer portion of said flexible disc between said inclined face and the face on the outer edge of said disc gradually decreases in thickness toward its lower end, thereby forming a substantially V-shaped flange 25 at the lower outer edge of the flexible disc.

The inner groove 23 is disposed immediately adjacent to the centrally arranged opening 26 that is formed in the flexible disc to receive the reduced portion 17 of the rod or shaft, and said groove is of sufficient depth to form a relatively narrow annular wall or flange 27 of material that surrounds the reduced portion 17 of the rod and bears thereupon to form a tight joint when the underside of the plunger is subjected to pressure.

The lower end of the reduced portion 17, or that portion that projects below the under face of disc 21, is reduced in diameter as designated by 30, thereby forming an annular shoulder 31 that occupies the same horrizontal plane with the underface of the disc 21.

Positioned on the reduced lower end portion 30 and against the underside of disc 21, is a plate or disc 32 that is preferably formed of metal and the central portion of which, or that portion around the opening that is provided for the member 30, bears directly against the shoulder 31.

The lower portion of the reduced member 30 is externally threaded and receives nuts 33 which serve to firmly clamp the disc or plate 32 upon the reduced lower end of the rod 15 and against shoulder 31 thereon.

Formed through the disc or plate 32 is a series of apertures 34 that communicate directly with the inner groove 23.

When the member 15, to which my improved plunger is attached, is moved downwardly in the cylindrical container to effect a discharge of grease or the like through the nozzle at the lower end of the container, the concentric grooves 22 and 23 in the underside of the flexible packing member 21 will become filled with the grease or other material and the pressure thereof will be directed upwardly unto the surfaces of the grooves or channels, with the result that the V-shaped flange 21 that surrounds the outer groove or channel will be forced outwardly into intimate contact with the inner surface of the container 10, and the annular wall 27 will be forced against the reduced portion 17 of rod 15, with the result that tight joints will be formed between the outer edge of the packing disc 21 and the inner face of container 10 and between the inner portion of said packing disc and the reduced portion 17, and which tight joints will be effective in preventing the leakage of grease or the like upwardly past the plunger.

Obviously, the packing effectiveness of the parts 25 and 27 of my improved plunger will increase correspondingly with the increase of pressure of the plunger against the material that is being discharged from the container or as the resistance to outward movement of the material increases.

The shoulder 31 between the reduced portions 17 and 30 of rod 15 serves as a stop to limit the upward movement of plate 32 and consequently permitting the flange 27 to act under pressure to hug the lower portion of reduced members 17 when the plunger is in operation.

While I have shown and described my improved plunger as being associated with a grease gun, it is obvious that the invention without material change, can be advantageously employed in various forms of pumps, compressors and the like, or any structure employing a plunger for expelling or discharging material from a container and where it is desired to eliminate leakage of the material upwardly or rearwardly past the plunger.

It will be readily understood that minor changes in the size, form and construction of the various parts of my improved plunger may be made and substituted for those herein shown and described without departing from the spirit of my invention, the scope of which is set forth in the appended claims.

I claim as my invention:

1. In a plunger, a carrier, a relatively thick disc of flexible material thereupon, which flexible disc is provided with a plurality of concentrically arranged grooves extending partially through the disc.

2. In a plunger, a carrier, a relatively thick disc of flexible material thereupon, which disc is provided with a plurality of concentrically arranged grooves extending partially through the disc, one of which grooves is disposed adjacent to the periphery of the disc and the other groove being disposed adjacent to the carrier.

3. In a plunger, a carrier, a relatively thick disc of flexible material thereupon, said disc being provided with grooves extending partially through the disc to form a flange adjacent to the lower outer edge of the disc, and a flange adjacent to said carrier.

4. In a plunger, a carrier, a substantially rigid disc positioned thereupon, a flexible disc positioned against the underside of the rigid disc, said flexible disc being provided in its underface with a plurality of concentrically arranged channels, and a disc positioned against the underside of said flexible disc.

5. In a plunger, a carrier, a substantially rigid disc positioned thereupon, a flexible disc positioned against the underside of the rigid disc, said flexible disc being provided in its underface with a plurality of concentrically arranged channels, and a disc positioned against the underside of said flexible disc, which last mentioned disc is provided with apertures which communicate with the inner one of the channels in said flexible disc.

6. In a plunger, a carrier, a disc of flexible material positioned upon said carrier, said disc being provided with a marginal flange and a flange immediately adjacent the carrier, said flanges having their sides unobstructed for pressure against the same.

7. As an article of manufacture, a packing member for plungers comprising a relatively thick disc of flexible material provided with a plurality of annular grooves extending partially through the disc.

8. As a new article of manufacture, a packing member for plungers comprising a disc of flexible material provided in its underface with a plurality of annular concentrically disposed grooves, the same being disposed so as to form relatively narrow walls of material at the periphery of said disc and adjacent to the opening that is formed in the center of said disc to receive its carrying member.

9. As a new article of manufacture, a plunger packing member comprising a disc of flexible material provided with an annular concentrically arranged groove that is disposed immediately adjacent to the periphery of the disc so as to form between said groove and said periphery, a relatively narrow wall of material, said grooves having both side walls unobstructed for pressure against the same.

In testimony whereof I have signed my name to this specification.

WILLIAM CARL IFTIGER.